United States Patent

Chikuma

[15] 3,701,035

[45] Oct. 24, 1972

[54] HIGH FREQUENCY AMPLIFICATION SYSTEM

[72] Inventor: Toichi Chikuma, Kawagoe, Japan

[73] Assignee: Girling Limited, Birmingham, England

[22] Filed: Oct. 9, 1970

[21] Appl. No.: 79,567

[52] U.S. Cl. ........................330/31, 330/21, 330/112

[51] Int. Cl. ..................................................H03f 3/04

[58] Field of Search......325/329, 430, 328, 451, 486; 330/21, 31, 103, 104, 112

[56] References Cited

UNITED STATES PATENTS

| | | | |
|---|---|---|---|
| 2,796,469 | 6/1957 | Papouschek | 330/104 X |
| 2,816,220 | 10/1957 | Goodrich | 325/451 |
| 2,937,343 | 5/1960 | Raper et al. | 325/451 X |

*Primary Examiner*—Roy Lake
*Assistant Examiner*—Lawrence J. Dahl
*Attorney*—Wenderoth, Lind and Ponack

[57] ABSTRACT

A high radio frequency amplification system applicable to radio receiving in which a low input voltage having a particular frequency fed from an input tuning circuit is amplified in amplifier to provide an output signal voltage having the same frequency as that of the said input signal voltage, a portion of said output signal voltage is fed back to said amplifier, another portion of the rest of said output signal voltage is fed back to said amplifier after doubling the frequency of the second portion of signal voltage whereby said low input voltage having the particular frequency, said fedback voltage having the same frequency as that of the input voltage and constituting a portion of said output voltage and a voltage constituting another portion of the rest of said output voltage and having a frequency two times as high as that of the first-mentioned two types of voltage are mixed together in said mixing amplifier so as to obtain a high output voltage having the same frequency as that of said input voltage.

1 Claim, 2 Drawing Figures

PATENTED OCT 24 1972 3,701,035

TOICHI CHIKUMA,

INVENTOR

BY Wenderoth, Lind & Ponack

ATTORNEYS

HIGH FREQUENCY AMPLIFICATION SYSTEM

BACKGROUND OF THE INVENTION

There have been proposed various types of radio receiving systems and as one of the conventional radio receiving systems the so-called regenerative receiving system has been known. According to the conventional regenerative receiving system, a portion of a signal which was detected and amplified is regeneratively amplified by feeding the same back so as to increase the detection sensibility of the detector employed. While the regenerative receiving system has the advantage that the system makes it possible to use a relatively simple device in association with the detector because the latter has a very high sensibility, the operation of the device is unstable or unreliable and is not easy. Furthermore, the device referred to above frequently tends to oscillate to such an extent that the oscillation of the device interferes with the normal operation of a receiver and other devices employed in the system.

Since the conventional regenerative receiving system has the disadvantages as mentioned above, as one of the radio receiving systems, at present the so-called superheterodyne system has been mostly employed in place of the regenerative receiving system. According to the superheterodyne system, a voltage having a once-amplified carrier wave frequency of $f_o$ and a voltage having a frequency of $f$which is approximate to the frequency $f_o$ are generated in a local oscillator, the thus generated voltages having the frequencies of $f_o$ and $f_i$, respectively, are mixed together in a mixer so as to provide a voltage having a beat frequency of $f_o - f$and finally, the resulting voltage of the beat frequency of $f_o - f$ is amplified in an amplifier to provide an increased output. Thus, the superheterodyne system is advantageous in that output is great and has an excellent selectivity within a particularly specified bandwidth. However, the superheterodyne system has inherent disadvantages that the devices employed in the system have a complicated construction and are not easy to manufacture and adjust.

SUMMARY OF THE INVENTION

This invention relates to a high radio frequency amplification system applicable to radio receiving and more particularly, to a high radio frequency amplification system which can effectively eliminate the disadvantages inherent in the conventional radio receiving systems.

Another object of the present invention is to provide a high radio frequency amplification system which comprises in combination the advantages of the conventional regenerative receiving system and those of the conventional superheterodyne system whereby a portion of a detected signal voltage having a particular frequency is regenerated and amplified by feeding the same back and another voltage of a frequency different from the frequency of the first-mentioned voltage is mixed with the latter.

A still further object of the present invention is to provide a reliable, highly precise and high output high radio frequency amplification system.

According to the present invention, a low input signal voltage having a particular frequency fed from an input tuning circuit is amplified in a mixing amplifier to provide an output signal voltage having the same frequency as that of said input voltage, a portion of said output signal voltage is fed back to said mixing amplifier and another portion of the rest of said output signal voltage is fed back to said mixing amplifier after doubling the frequency of the second voltage portion through a frequency doubler whereby said low output voltage having the particular frequency fed directly from said input tuning circuit, said first portion of the output signal voltage having the same frequency as that of the input voltage and said second portion of the output signal voltage having its frequency transformed into a frequency two times as high as that of said particular frequency are mixed together in said mixing amplifier and the above regenerative amplification procedure is repeated to obtain a high output voltage having the same frequency as said particular frequency.

According to the present invention, there has been provided a high radio frequency amplification system in which a low input signal voltage having a particular frequency fed from an input tuning circuit is applied between the base and emitter of a mixing transistor, an output signal voltage having said particular frequency is sampled out of output voltages on the output of said transistor by an output tuning circuit connected to the output of the transistor, a portion of said output signal voltage having the particular frequency is positive fed back from said output tuning circuit through a positive feedback circuit to said input tuning circuit and another portion of the rest of said output signal voltage is applied between said base and emitter of the transistor after doubling the frequency of said second voltage portion through a frequency doubler to be fed back so as to establish a regenerative amplification circuit, whereby said low input signal voltage having said particular frequency coming directly from said input tuning circuit, a positive feedback voltage having said particular frequency supplied to said transistor through said positive feedback circuit and input tuning circuit, said positive feedback voltage being a portion of said output signal voltage amplified in said transistor and sampled out of the transistor by said output tuning circuit and having the particular frequency, and a voltage having a frequency two times as high as said particular frequency, said voltage having the frequency two times as high as the particular frequency being provided by doubling the frequency of another portion of the rest of said output voltage having the particular frequency on the output of the transistor by said frequency doubler, are mixed together and amplified in said transistor to provide a high output voltage having the same frequency as that of said low input signal voltage.

The above and other objects and attendant advantages of the present invention will be more clearly understood by those skilled in the art from a reading of the following detailed description of one preferred embodiment of the invention referring to the accompanying drawing which shows the invention for illustrative purpose only, but not for limiting the scope of the same in any way.

PREFERRED EMBODIMENT OF THE INVENTION

Figure 1:
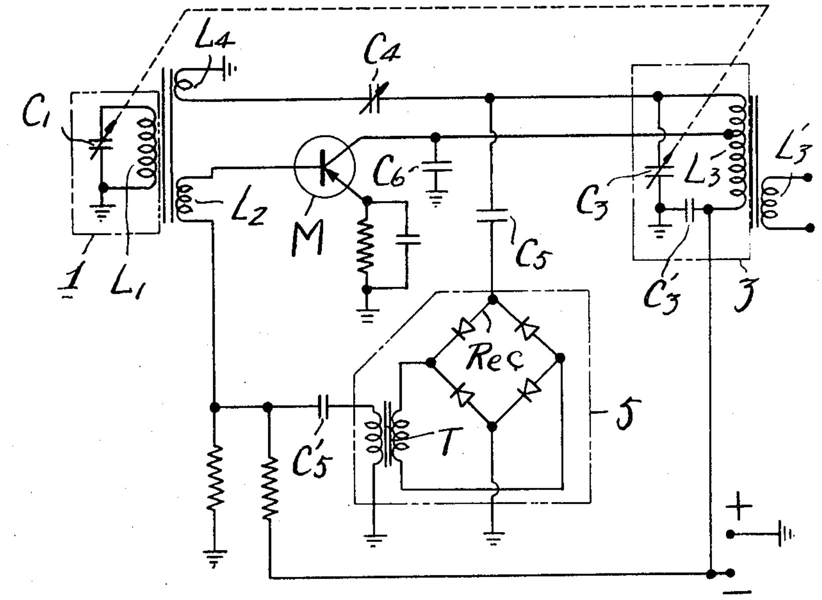
FIG. 1 is a circuit diagram showing one preferred embodiment of a system for amplifying high radio frequencies according to the present invention.

The present invention will now be described referring to the accompanying drawing which illustrates one preferred embodiment of a system for amplifying high radio frequencies according to the present invention.

A low input signal voltage having a particular radio frequency is received by an antena (not shown) together with other voltages having different radio frequencies and detected by an input tuning circuit 1 which comprises an input tuning capacitor $C_1$ and an input tuning coil $L_1$. The detected voltage is applied through a matching coil $L_2$ between the base and emitter of a transistor M which functions as a mixing amplifier where the voltage is amplified. The output or collector of the transistor M is connected to an output tuning circuit 3 which comprises an output tuning capacitor $C_3$, an output tuning coil $L_3$ and a bypass capacitor $C'_3$ and which detects an output signal having a particular frequency out of the output signal outputs on the output of the transistor M. The particular frequency signal appears as an output on the output of an output matching coil $L'_3$ of the above-mentioned output tuning circuit 3 which coil functions as an output sampling means of the tuning circuit.

The input tuning capacitor $C_1$ which constitutes one component of the input tuning circuit 1 and the output tuning capacitor $C_3$ which constitutes one component of the output tuning circuit 3 are variable gang capacitors and adjusted simultaneously under the same conditions.

A portion of the particular frequency output voltage from the output tuning circuit 3 is positively fed back through a variable positive feedback capacitor $C_4$ and a positive feedback coil $L_4$ to the input tuning circuit 1.

Another portion of the particular frequency voltage from the output tuning circuit 3 is sent through a coupling capacitor $C_5$ to a frequency doubler 5 which in the illustrated embodiment comprises a bridge-type rectifier Rec and a transformer T where the particular frequency of the second voltage portion is doubled. The thus obtained frequency voltage is applied through a coupling capacitor $C'_5$ and the matching coil $L_2$ between the base and emitter of the transistor M.

Thus, between the base and emitter of the transistor M the direct low input voltage having a particular frequency which has been detected and tuned by the input tuning circuit 1, the first feedback voltage portion which is a portion of the output voltage having the particular frequency which has been once amplified by the transistor M and sampled by the output tuning circuit 3 and the second voltage portion having a frequency two times as high as the particular frequency of the first voltage portion which second voltage portion is a portion of the output voltage amplified by the transistor M and sampled by the output tuning circuit 3, but the frequency of which second voltage portion has been doubled by the frequency doubler 5.

Now, the frequency transforming function of the transistor M will be described. It is assumed that an input signal wave voltage of $e_f = E_f \cos{\cdot}\omega_f t$ and a local oscillation voltage of $e_o = E_o \cos{\cdot}\omega_o t$ are simultaneously applied between the base and emitter of the transistor M, for example, and then the relationship between the collector current $i_c$ and the base - emitter voltage $V_{be}$ will be expressed by the following approximate equation:

$$i_c = K_o + K_1 V_{be} + K_2 V_{be}^2 \qquad (1)$$

wherein $K_o$, $K_1$ and $K_2$ are constants which are determined depending upon the chracterau of the particular transistor employed.

Since the input signal wave $e_f$ and the local oscillation voltage $e_o$ are applied in a superimposed relation between the transistor base and emitter, $$V_{be} = E_f \cos{\cdot}\omega_f t + E_o \cos{\cdot}\omega_o t \qquad (2)$$

wherein $\omega_f$ and $\omega_0$ are angular velocities and $t$ is a time period.

When the Equation (2) is inserted into the Equation (1), then $$\begin{aligned}
i_c = & K_0 + K_1(E_f \cos.\ \omega_f t + E_0 \cos.\ \omega_0 t) \\
& + K_2(E_f \cos.\ \omega_f t + E_0 \cos.\ \omega_0 t)^2 \\
= & K_0 + K_1 E_f \cos.\ \omega_f t + K_1 E_0 \cos.\ \omega_0 t \\
& + K_2 E_f^2 \cos.\ 2\omega_f t + K_2 E_0^2 \cos.\ 2\omega_0 t \\
& + 2K_2 E_f E_0 \cos.\ \omega_f t \cdot \cos\ \omega_0 t \\
= & K_0 + K_1 E_f \cos.\ \omega_f t + K_1 E_0 \cos.\ \omega_0 t \\
& + \frac{K_2 E_f^2}{2}(1 + \cos.\ 2\omega_f t) + \frac{K_2 E_0^2}{2}(1 + \cos.\ 2\omega_0 t) \\
& + K_2 E_f E_0 [\cos.\ (\omega_f - \omega_0)t + \cos.\ (\omega_f + \omega_0)t] \\
= & K^0 + \frac{K_2}{2}(E_f^2 + E_0^2) + K_1 E_f E_0 \cos.\ \omega_f t + K_1 E_0 \cos.\ \omega_0 t \\
& + \frac{K_2}{2} E_f^2 + \cos.\ 2\omega_f t + \frac{K_2}{2} E_0^2 \cos.\ 2\omega_0 t \\
& + K_2 E_f E_0 [\cos.\ (\omega_f - \omega_0)t + \cos.\ (\omega_f + \omega_0)t] \qquad (3)
\end{aligned}$$

According to the present invention, when it is assumed that an input signal wave having the bandwidth of B with the center frequency of $f$ has a low input voltage of $e_f = E_f$ and an input signal wave to be applied from the frequency doubler to the transistor M is $e_o = E_o \cos{\cdot}2\omega_f t$, *then the above Equation* (3) will be as follows:

$$\begin{aligned}
i_c = & K_0 + \frac{K_2}{2}(E_f^2 + E_0^2) + (K_1 E_f + K_2 E_f E_0) \cos.\ \omega_f t \\
& + \left(K_1 E_0 + \frac{K_2}{2} E_f^2\right) \cos.\ 2\omega_f t + K_2 E_f E_0 \cos.\ 3\omega_f t \\
& + \frac{K_2}{2} E_0 \cos.\ \omega_f t \qquad (4)
\end{aligned}$$

in other words, a signal wave voltage having the particular frequency f and signal wave voltages having frequencies $2_f$, $3_f$ and $4_f$, respectively, appear on the output of the transistor M.

Thereafter, except for the signal wave voltage having the particular frequency $f$, the remaining output signal wave voltages $2_f$, $3_f$ and $4_f$ are removed by a bypass capacitor $C_6$ which is connected to the output or the collector of the transistor M.

Figure 2:
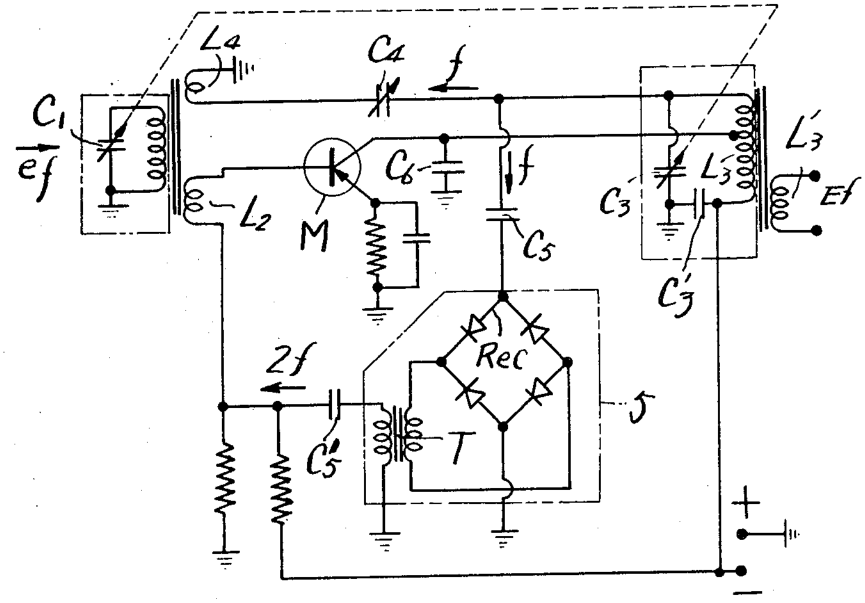
FIG. 2 is similar to FIG. 1, but shows the function of the circuit.

And now, when the low input voltage $e_f$ having the bandwidth B with the center frequency $f$ is detected by the input tuning circuit 1 as shown in FIG. 2, the detected voltage $e_f$ is applied through the matching coil $L_2$ between the base and emitter of the transistor M where the voltage is distortionally amplified and then applied to the output tuning circuit 3. A portion of the voltage having the particular frequency *f* obtained in the output tuning circuit 3 is applied through the coupling capacitor $C_5$ to the frequency doubler 5 where the voltage portion is transformed into a voltage having a frequency $2f$ which is two times as high as the particular frequency *f* and the doubled frequency voltage is then applied through the coupling capacitor $C'_5$ and the above-mentioned matching coil $L_2$ between the base and emitter of the transistor M.

And another portion of the rest of the voltage having the particular frequency *f* obtained in the output tuning circuit 3 is applied in a suitable amount through the variable positive feedback capacitor $C_4$, variable positive feedback coil $L_4$, input tuning circuit 1 and matching coil $L_2$ between the base and emitter of the transistor M.

The above-mentioned three types of voltages applied to the non-linear section of the transistor M, that is, the low input voltage $e_f$, positive feedback voltage and doubled frequency voltage are mixed together and amplified in the transistor M. Thus, two signal voltages of the two types of frequencies one of which is the voltage having the frequency of *f* and the other of which is the voltage having the frequency of $2f$ are applied to the transistor M, but due to the difference between the two types of frequencies, an output having a beat frequency of $2f - f - f$, that is, of *f* is obtained on the output of the transistor M and as a result, an output signal voltage having the frequency *f* obtained through the amplification of the above-mentioned three types of voltages is provided on the output of the transistor M. Although output signal wave voltages having the frequencies of $2f$, $3f$ and $4f$ appear on the output of the transistor M as mentioned above, these voltages are removed the bypass capacitor $C_6$. Furthermore, the above-mentioned three types of voltages are mixed together and amplified in the transistor M and a portion of the resulting voltage having doubled a frequency while another portion of the rest of the resulting voltage is positively fed back to be mixed together with the other voltages in the transistor M and the resulting output voltage is sampled from the transistor M by the output tuning circuit 3 while being amplified by the transistor and removed as the output from the output matching coil $L'_3$. By repeating the above-mentioned procedure, a high output voltage $E_f$ having the same frequency *f* as that of the low input signal voltage is obtained in the output matching coil $L'_3$. It will be easily seen by those skilled in the art that if the voltage whose frequency has been doubled is applied to the transistor M after the amplification of the voltage, a more satisfactory amplifying effect max be obtained.

As is clear from the foregoing description of the invention, there has been provided a reliable, highly precise, high gain and excellently selective high radio frequency amplifying system which is carried out the steps of amplifying a low input signal voltage having a particular frequency obtained from an input tuning circuit in a transistor, applying said amplified voltage to an output tuning circuit so as to provide an output voltage having said particular frequency, transforming a portion of said output voltage into a voltage having a frequency two times as high as said particular frequency by a frequency doubler, applying said doubler frequency voltage portion to said transistor, applying another portion of the rest of said voltage having the particular frequency obtained from said output tuning circuit by means of positive feedback through said input tuning circuit to said transistor as to mix said voltage while amplifying the same and repeating said regenerative amplifying procedure until a high voltage having the same frequency as that of said input signal voltage is obtained as an output from the output of said output tuning circuit.

Furthermore, according to the present invention the high frequency amplifying operation can be performed in a system having a relatively simple construction.

While one specific example of the present invention has been shown and described in detail, it will be understood that the same is for illustration only and is not to be taken as a definition of the scope of the invention, reference being had for this purpose to the appended claim.

What is claimed is:

1. A high radio frequency amplification system comprising an input tuning circuit for detecting a low input signal voltage having a particular frequency, a mixing transistor having said input tuning circuit coupled between the base and emitter thereof, an output tuning circuit coupled to the collector of said mixing transistor for receiving an output signal voltage having said particular frequency from said transistor, a positive feedback circuit coupled between said output tuning circuit and said input tuning circuit for positively feeding back a portion of said output signal voltage having the particular frequency, and a frequency doubler having an input coupled to said output tuning circuit and having an output coupled across the base and emitter of said transistor, said frequency doubler receiving another portion of the rest of said output signal voltage and after doubling the frequency applying it between said base and emitter of the transistor, whereby three voltages, (a) said low input signal voltage having said particular frequency coming directly from said input tuning circuit, (b) a positive feedback voltage having said particular frequency and supplied to said transistor through said positive feedback circuit and input tuning circuit, said positive feedback voltage being a portion of said output signal voltage amplified in said transistor and received from the transistor by said output tuning circuit and having the particular frequency, and (c) a voltage having a frequency two times as high as said particular frequency provided by doubling the frequency of another portion of the rest of said output voltage having the particular frequency from the transistor by said frequency doubler, are mixed together and amplified in said transistor to provide a high output voltage having the same frequency as that of said low input signal voltage.

* * * * *

UNITED STATES PATENT OFFICE
CERTIFICATE OF CORRECTION

Patent No. 3,701,035 Dated October 24, 1972

Inventor(s) TOICHI CHIKUMA

It is certified that error appears in the above-identified patent and that said Letters Patent are hereby corrected as shown below:

Delete Item [73] Assignee: Girling Limited, Birmingham, England.

Signed and sealed this 1st day of October 1974.

(SEAL)
Attest:

McCOY M. GIBSON JR.
Attesting Officer

C. MARSHALL DANN
Commissioner of Patents